Dec. 20, 1966 C. B. DE VLIEG ET AL 3,292,238
ADJUSTABLE CUTTING TOOL
Filed Jan. 4, 1965 2 Sheets-Sheet 1
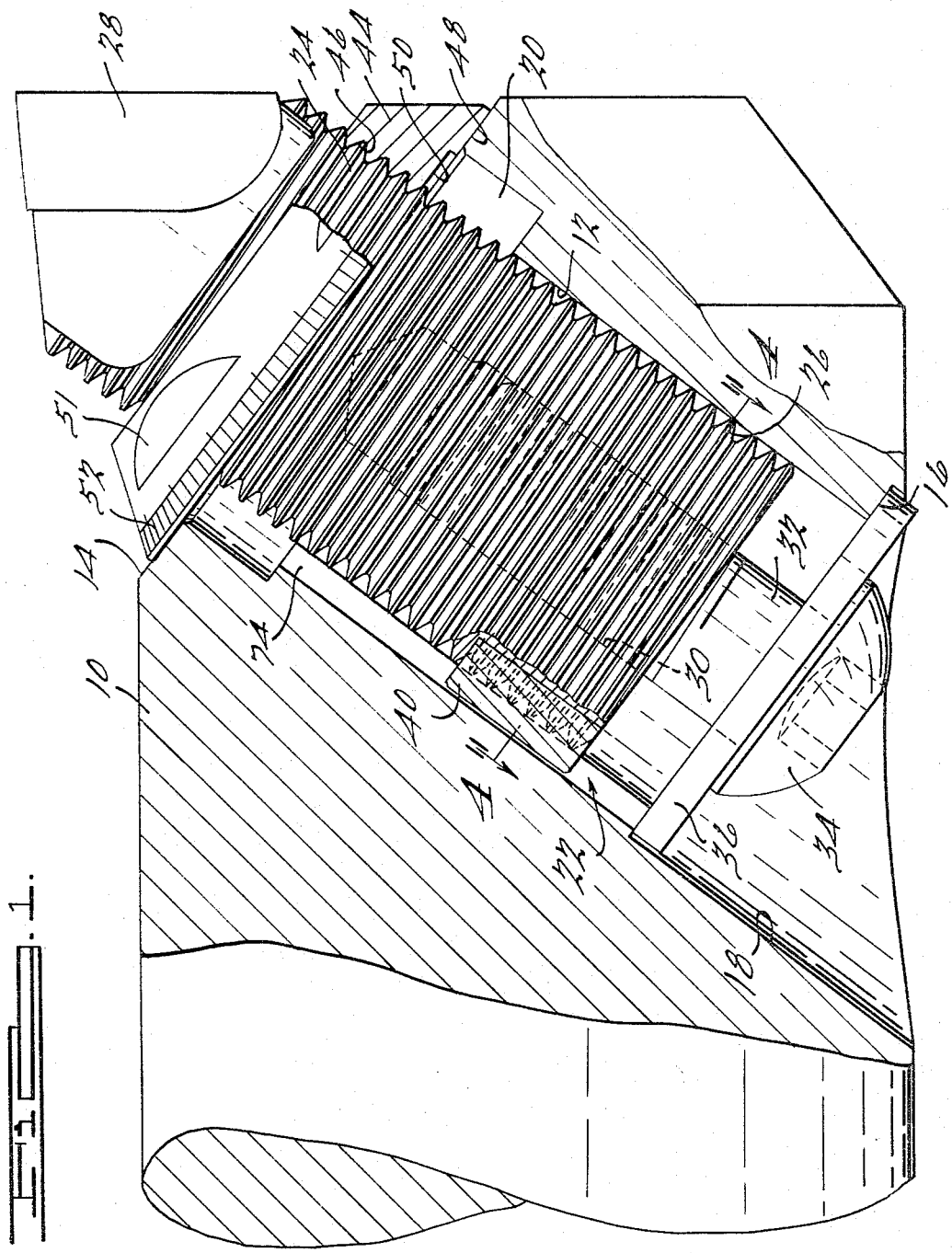
INVENTORS.
Charles B. DeVlieg
Allen N. Sweeny
BY
Harness, Dickey & Pierce
ATTORNEYS.

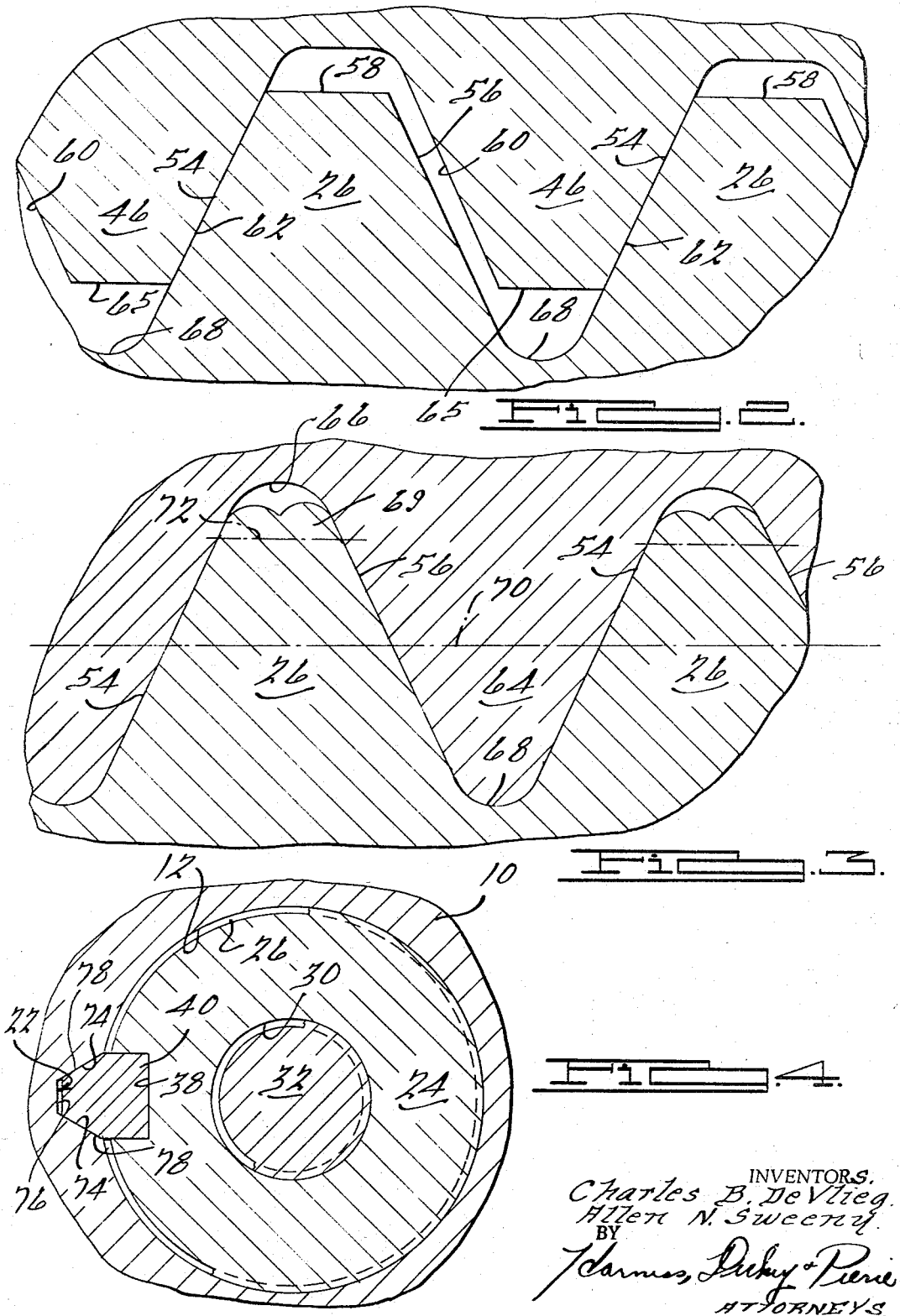

3,292,238
ADJUSTABLE CUTTING TOOL
Charles B. De Vlieg, Bloomfield Hills, and Allen N. Sweeny, Grosse Pointe, Mich., assignors to De Vlieg Machine Company, Royal Oak, Mich., a corporation of Michigan
Filed Jan. 4, 1965, Ser. No. 422,897
7 Claims. (Cl. 29—96)

This invention relates to metal cutting tools, and particularly to an adjustable metal cutting tool adapted for use in boring, turning and other machining operations.

The cutting tool of the present invention is of the general type employing a threaded shank provided with a cutting tip, a tool holder body having a bore within which the shank is nonrotatably received, an adjusting collar adapted to be threaded on the shank to adjust the shank along its thread axis, and a locking element operable to hold the adjusting collar against a locating surface on the tool holder body. Adjustable cutting tools of this general type have been known for some time. For example, the tool shown in De Vlieg patent No. 2,537,517 has enjoyed far reaching commercial success and has a proven degree of accuracy capable of meeting the most exacting accuracy requirements. It has been found, however, that there are many applications for adjustable cutting tools which do not demand the extreme precision of this prior tool, and where a somewhat less costly tool is desirable. The tool of the present invention has been designed to meet this need. Accordingly, it is an object of the present invention to provide an adjustable metal cutting tool of the foregoing general type which may be manufactured at a relatively low cost with commonly available machine tools and equipment and, while not possessing the ultimate in accuracy, is highly accurate by most industrial standards and is capable of meeting the tolerance requirements of a wide range of applications for adjustable cutting tools.

It is another object of the present invention to provide an adjustable cutting tool that is convenient to use, reliable in performance, and rugged in construction. These and other objects of the present invention will become apparent from the following detailed description, taken in junction with the accompanying drawings, wherein:

FIGURE 1 is a view partly in vertical diametrical section and partly in elevation with parts broken away of a metal cutting tool made in accordance with the principles of the present invention;

FIG. 2 is an enlarged view in full section of a portion of the structure of FIG. 1;

FIG. 3 is a sectional view of a part of the structure of FIG. 2 and of a die used in the fabrication of said part, showing the condition of the part during a stage of its fabrication; and FIG. 4 is an enlarged sectional view of the structure of FIG. 1 taken along the line 4—4 thereof.

Referring now to the drawings, and particularly to FIG. 1, a tool holder body, in the form of a boring bar 10, is shown at 10. The bar 10 is adapted to be held by the spindle of a machine tool (not shown) for rotation about its longitudinal axis in the conventional manner. It should be appreciated, however, that various tool holder bodies may be employed within the scope of the present invention, depending upon the type of machine with which the cutting tool is to be employed.

The bar 10 is formed with a bore 12 that is open at its opposite ends and with a flat annular locating surface 14 surrounding one end of the bore 12 and disposed perpendicular to the bore axis. An annular abutment shoulder 16 is formed in the bore at its end opposite from the locating surface 14, resulting from the machining of a counterbore 18 in this end of the bore 12. A counterbore 20 is also machined in the end of the bore 12 adjacent to the locating surface 14. A keyway 22 extends axially along the wall of the bore 12 between the counterbores 18 and 20.

The bore 12 serves to slidably receive and support a threaded tool shank 24, the outer periphery of which is formed with a thread 26. The forward end of the shank 24 carries a cutting tip 28 which may be made from tungsten carbide or other hard material brazed to the shank 24 or may be machined directly on the shank 24. The shank 24 is desirably made from steel as is the boring bar 10 and the other parts of the assembly. The rear end of the shank 24 is provided with a central axially extending tapped hole 30 into which a locking screw 32 is threaded. The screw 32 passes through a washer 36 abutting the annular shoulder 16 and has a head 34 engageable with the washer. The outer periphery of the shank 24 is formed with a recess or slot 38 for the reception of a key 40 conforming in cross sectional shape to the keyway 22 and slidable therein.

An adjusting collar 44 having an internal thread 46 is threaded on to the shank thread 26. The collar 44 has an annular flat seat 48 engageable with the locating surface 14 and spaced radially outwardly from the thread 46 by virtue of the formation of an annular recess 50 formed on one side thereof between its seat 48 and thread 46. In addition, the outer periphery of the collar 44 is provided with wrench-receiving flats 51 and graduated indicia 52 adapted to be read in conjunction with indicia (not shown) on the locating surface 14. Although not illustrated herein, the counterbore 20 of the boring bar 10 serves to accommodate an annular wave washer and nut similar to the wave washer and nut shown in our prior United States Patent No. 2,849,902; however, the use of such a wave washer and nut is optional and forms no part of the present invention.

Turning now to FIG. 2, the cross sectional configuration of the thread 26 of the tool shank 24 and the thread 46 of the collar 44 will be seen in detail. The thread 26 has a trailing or rear flank 54 and a leading flank 56 which are angularly disposed with respect to one another and preferably define an included angle of 55° or less. In the specific embodiment illustrated this angle is 50°. Furthermore, it will be seen that the thread 26 is provided with a crest surface 58 which lies on a circular cylinder and extends between the flanks 54 and 56. The thread surface 58 forms the radially outer periphery of the tool shank 24 and is sized to fit snugly but slidably within the bore 12. Only sufficient clearance exists between the surface 58 and the wall of the bore 12 to permit the shank 24 to be moved axially within the bore 12 without binding. Accordingly, the surface 58 serves to locate the shank 24 with its thread axis coincident with the axis of the bore 12.

The adjusting collar thread 46 has a leading flank 60 and a trailing flank 62 defining an included angle identical to the angle of the flanks 54 and 56. The thread 46 has a crest 65 spaced from a root portion 68 of the shank thread 26.

The angle formed by the thread flanks depicted in FIG. 2 is of importance in the accurate performance of the tool of the present invention. An angle of 55° or less is desirable for providing sufficient axial length to the crest surface 58 to achieve extensive area contact between the thread 26 and the wall of the bore 12 while simultaneously affording sufficient area to the flank 54. Such extensive area contact is desirable for properly locating and preventing deflection of the shank 24. The rear flank 54 of the thread 26 and the flank 62 of the thread 46 are disposed at an angle of at least 17° to a plane perpendicular to the axis of the thread 26. In the illustrated embodiment this angle equals 25°. An angle of at least 17° will serve to center the collar 44 with respect to the shank 24. As the shank 24 is drawn rearwardly within the bore 12, its rear flank 54 bears against the flank 62 of the collar thread 46. This, of course, draws the collar seat 48 against the locating surface 14. However, it also applies a wedging or centering action to the collar 44 resulting from the radially outward forces exerted on all sides of the collar through the substantial inclination of the flanks 54 and 62. The result is that the collar 44 is precisely centered with its thread axis coincident with the thread axis of the tool shank 24. By virtue of centering the collar 44, it supports the tool shank 24 with equal force on all sides thereof without deflecting the shank 24 from its desired axial alignment. It is believed that a flank angle of less than 17° would be insufficient to provide the significant centering action which is desired.

One of the advantageous features of the present invention is the ease with which the tool shank 24 may be fabricated to the desired shape to highly accurate tolerances. According to the present invention, the tool shank 24 is fabricated from a workpiece having a cylindrical outer periphery of a diameter substantially equal to the pitch diameter 70 (FIG. 3) of the thread 26. The periphery of the workpiece is subjected to a thread rolling operation by the use of a thread rolling die 64 having the cross sectional thread configuration indicated in FIG. 3. The thread of the die 64 is contoured to form the thread flanks 54 and 56. Furthermore, the die 64 has a thread root portion 66 between its thread convolutions which is spaced from the original rolled crest portion 69 of the thread 26. In other words, the cavities of the die 64 are not completely filled during the rolling operation. The rolled thread crest 69 has a rather irregular contour inasmuch as it is not confined or shaped by the die thread root 66. This assures that the flanks 54 and 56 will accurately correspond to the shape of the die thread flanks. The original rolled thread crest 69 is removed to a diameter 72 by means of a centerless grinding operation (using a conventional centerless grinding machine) so that the thread surface 58 will lie on this diameter. The foregoing process assures that the flanks 54 and 56 of the thread 26 will be formed in an accurate manner and that the surface 58 will be finished to a very exact size and geometric shape. For example, the surface 58 may be finished to an across-diameter tolerance of less than 0.0003 inch.

Turning to FIG. 4, the configuration of the key 40 and keyway 22 are illustrated in detail. It will be seen that the keyway 22 is formed with a pair of angularly related side walls 74 which are parallel to the thread axis and which extend in a radially outwardly converging direction and merge with a keyway rear wall 76. The keyway side walls 74 are adapted to be flatly engaged by a pair of inclined walls 78 formed on the key 40. The key 40 is preferably cemented in the slot 38 and is so positioned that its side walls 78 will conformably engage both key walls 74 to permit the key 40 to slide axially in the keyway 22 and prevent rotation of the tool shank 24 as it is adjusted along the axis of the bore 12. In the particular embodiment of the invention illustrated herein, the key side walls 78 and the walls 74 of the keyway 22 preferably define an included angle of between 50° and 80° and in the illustrated embodiment this angle is 60°. The angular side walls 74 and 78, of course, take the angular loads imposed on tool shank 24 and their relation to a radial plane causes the keyway walls 76 to apply a force to the key walls 78 tending to force the key 40 radially inwardly into its slot 38. In ordinary key and keyway constructions in which a key is fixed in a slot and is slidable in a keyway, angular forces imposed on a key tend to dislodge the key from the member which carries it. The present construction, however, does not attempt to wedge the key 40 out of the slot 38 but, rather, helps keep the key seated in its slot. For this reason cements or other bonding agents which may be applied at room temperature can be utilized to secure the key 40 in its slot 38. In prior constructions, it has been conventional to braze a separate key to the member which carries it to hold the key in place with sufficient strength and prevent it from being pulled out of its slot. Of course, brazing heats up the surrounding parts of the assembly causing distortion, producing stresses and otherwise interfering with the heat treatment of the parts. The present construction permits the use of a lower strength bonding material and eliminates the necessity for using high temperature techniques which can impair the overall accuracy of the assembly. The angular relationship of the walls 74 and 78 is preferably at least 50° in order to produce a sufficient radially inward component of force on the attempted rotation of the tool shank 24. The angular relation of the parts is preferably 80° or less to avoid tolerance problems and assure that there will be no slop or looseness of fit between the key and the keyway.

It will be seen that the radially outer end of the key 40 is spaced from the rear wall 76 of the keyway thus assuring that the only contact between the key and the keyway will be the contact of the side walls 78 with the walls 74.

The position of the cutting tip 28 with respect to the locating surface 14 is adjusted by first loosening the locking screw 32 and then rotating the collar 44 the desired amount. The locking screw 32 is then retightened and the cutting tip 28 will be secured in a new position. The advancement of the tip 28 radially of the axis of rotation of the tool for a given angular movement of the collar may be read on the indicia 52 which are calibrated with reference to the lead of the threads 26 and 46 and the angular mounting of the shank 24 with respect to the axis of rotation of the tool.

In reviewing the functions of the various parts of the cutting tool of the present invention, it will be seen that the crest surface 58 of the thread 26 functions to position the axis of the tool shank 24 coincident with the axis of the bore 12, whereas the adjusting collar 44 positions the tool shank 24 along its thread axis. Furthermore, the flanks of the thread 26 function to align and position the collar 44 with respect to the tool shank 24 and to assure support for the tool shank 24 equally on all sides thereof. It will be seen that the adjusting collar 44 is completely unrestrained by the bar 10 in a direction transversely of its thread axis and its position transversely of this axis is established entirely by the engagement of its thread flank 62 with the flank 54 of the tool shank thread 26. Also, it is to be noted that the periphery of the washer 36 has clearance with respect to the counterbore 18 and the shank of the lock screw 32 has clearance with respect to the hole in the washer 36 through which it passes. Accordingly, none of the parts associated with the tool shank 24 attempts to interfere with the function of the thread crest surface 58 in aligning the axis of the tool shank 24 with the axis of the bore 12. Also, it will be seen that the collar seat 48, being spaced radially outwardly from the thread 26, assures a good firm support for the collar 44 and minimizes any tendency of the tool shank 24 to deflect laterally from its desired position.

While it will be apparent that the preferred embodiment herein illustrated is well calculated to fulfill the objects above state, it will be appreciated that the invention is susceptible to modification, variation and change without departing from the proper scope or fair meaning of the subjoined claims.

What is claimed is:

1. An adjustable metal cutting tool including a tool holder body having a bore and a flat annular locating surface disposed about and perpendicular to the axis of said bore at one end of said bore, a cutter element non-rotatably supported in said bore for adjustment along the axis thereof, said cutter element having an external thread provided with a trailing flank disposed at an angle of at least 17° to said locating surface, and a crest surface conformably engageable with the wall of said bore to maintain said cutter element in an alignment with the axis of said bore, a cutting tip at one end of said cutter element, an adjusting collar threaded on said cutter element and having a seat engageable with said locating surface, said collar being unrestrained by said tool holder body in a direction parallel to said locating surface, and locking means engageable with said cutter element and operable to apply a force thereto in a direction seating said collar against said locating surface, said collar having a thread flank conformably engageable with said cutter element thread trailing flank whereby said collar will be positioned with respect to said cutter element by said engaging thread flanks.

2. An adjustable metal cutting tool including a tool holder body having a bore and a flat annular locating surface disposed about and perpendicular to the axis of said bore at one end of said bore, a cutter element nonrotatably supported in said bore for adjustment along the axis thereof, said cutter element having an internal thread provided with a trailing flank disposed at an angle of at least 17° to said locating surface, a leading flank disposed at an angle of not more than 55° to said trailing flank and a cylindrical crest surface conformably engageable with the wall of said bore to maintain said cutter element in an alignment with the axis of said bore, a cutting tip at one end of said cutter element, an adjusting collar threaded on said cutter element and having a seat engageable with said locating surface, said collar being unrestrained by said tool holder body in a direction parallel to said locating surface, and locking means engageable with said cutter element and operable to apply a force thereto in a direction seating said collar against said locating surface, said collar having a thread flank conformably engageable with said cutter element thread trailing flank whereby said collar will be positioned with respect to said cutter element by said engaging thread flanks.

3. An adjustable metal cutting tool including a tool holder body having a bore and an annular locating surface disposed about the axis of said bore at one end thereof, a cutter element nonrotatably supported in said bore for adjustment along the axis thereof, said cutter element having an external thread conformably engageable with the wall of said bore, said thread having opposite flank surfaces defining an included angle of between 35° and 55°, a cutting tip at one end of said cutter element, an adjusting collar threaded on the thread of said cutter element and provided with a seat engageable with said locating surface, said collar being unrestrained by said tool holder body in a direction transversely of the axis of said bore, and locking means connected between said cutter element and said tool-supporting body for seating said collar against said locating surface.

4. An adjustable metal cutting tool including a tool holder body having a bore and a flat annular locating surface disposed about one end of said bore and arranged perpendicular to the axis of said bore, a cutter element nonrotatably supported in said bore for adjustment along the axis thereof, said cutter element having an external thread provided with opposite flanks disposed at an included angle of between 35° and 55° and a cylindrical crest surface conformably engageable with the wall of said bore to maintain said cutter element in alignment with the axis of said bore, a cutting tip at one end of said cutter element, an adjusting collar threaded on said cutter element thread and having a flat annular seat engageable with said locating surface, said collar being otherwise unrestrained by said body in a direction perpendicular to the axis of said bore, and locking means engageable with said cutter element and operable to apply force thereto in a direction holding said collar against said locating surface.

5. An adjustable metal cutting tool including a tool holder body having a bore and a flat annular locating surface disposed about one end of said bore and arranged perpendicular to the axis of said bore, a cutter element supported in said bore for adjustment along the axis thereof, said cutter element having an external thread provided with opposite flanks defining an included angle of between 45° and 55° and a cylindrical crest surface conformably engageable with the wall of said bore to maintain said cutter element in alignment with the axis of said bore, a cutting tip at one end of said cutter element, an adjusting collar threaded on said cutter element thread and having a flat annular seat engageable with said locating surface, said collar being unrestrained by said tool-supporting body in a direction perpendicular to the axis of said bore, interfitting key and keyway means on said cutter element and on said tool holder body adjacent the wall of said bore whereby said cutter element will be advanced along the axis of said bore and will be held against rotation upon rotation of said collar on said cutter element, and locking means engageable with said cutter element operable to apply a force thereto seating said collar against said locating surface.

6. The structure set forth in claim 2 in which the thread crest of said cutter element comprises the portion of said cutter element of greatest diameter.

7. The structure set forth in claim 2 in which said adjusting collar has an annular recess formed on the side thereof adjacent said locating surface and disposed between said seat and said cutter element.

References Cited by the Examiner
UNITED STATES PATENTS 2,330,692   9/1943   De Vlieg _____ 77—58

WILLIAM W. DYER, Jr., *Primary Examiner.*
HARRISON L. HINSON, *Examiner.*